United States Patent [19]
Yuan

[11] Patent Number: 5,983,681
[45] Date of Patent: Nov. 16, 1999

[54] LOCK DEVICE FOR AN AUTOMATIC SHIFT LEVER

[76] Inventor: Li Chi Yuan, No. 740-7, Chung-Cheng Road, Hsin-Chuang City, Taipei, Taiwan

[21] Appl. No.: 09/033,599

[22] Filed: Mar. 3, 1998

[51] Int. Cl.[6] .................................................... B60R 25/06
[52] U.S. Cl. .............................................. 70/201; 70/247
[58] Field of Search ..................... 70/251, 201, 245–248, 70/195, 197

[56] References Cited

U.S. PATENT DOCUMENTS

| | | | |
|---|---|---|---|
| 5,329,792 | 7/1994 | Lee | 70/201 |
| 5,546,775 | 8/1996 | Lee | 70/201 |
| 5,735,148 | 4/1998 | Hsiao | 70/201 |
| 5,765,413 | 6/1998 | Jung | 70/201 |
| 5,809,813 | 9/1998 | Wang | 70/201 |

*Primary Examiner*—Lloyd A. Gall
*Attorney, Agent, or Firm*—Bacon & Thomas

[57] ABSTRACT

An improved lock device for the automatic shift lever of a car, and especially a lock device which still has a theft-proof effect after it is broken by limiting a limiting rod, wherein, in a receiving hole of a knob, a rear and a front hole is provided respectively on a protruding portion on the front end of an operating rod and at a position position on the periphery of an inner end of a push button to exactly receive the limiting rod which is surrounded by a spring, when the push button is pressed or released, the end of the limiting rod abuts against a plateform in the receiving hole, while the other end can freely slide to and fro relatively to the rear and front holes; and when in locking, the lever lock is rotated to render a stop piece provided between the push button and the protruding portion to rotate to the position between the rear and front holes to limit and to reduce the stroke of the limiting rod to the range between the plateform and the stop piece, thus an object of locking is attained.

3 Claims, 12 Drawing Sheets

LOCK DEVICE FOR AN AUTOMATIC SHIFT LEVER

BACKGROUND OF THE INVENTION

1. Field of the Invention

The present invention relates to an improved lock device for the automatic shift lever of a car, wherein, a stop piece is provided between a protruding portion of an operating rod and a push button, when a protruding end of the stop piece is rotated, the limiting rod capable of sliding freely can be located in position to obtain an object of securely locking.

2. Description of the Prior Art

Theft-proof devices for automobiles in the markets are divided into three kinds, theft-proof bells, steering wheel locks (namely the stick shaped lock), and shift lever locks, we hereby discuss the principles and disadvantages thereof:

1) A theft-proof bell uses balancing principle to allow the switch of a buzzer to be turned on for scaring a thief; however, if a passenger inadvertently touches the car body, or even when vibrating is effected by a car passing by, the bell will make a loud noise, this can break quiet and peaceful mood of people, and the theft-proof bell is operated by taking advantage of the battery of the car, so that the car is subjected to electricity leakage when in parking.

2) A steering wheel lock provides a lock head in the middle of a bar, it can be used to lock on the periphery of the steering wheel, length of the bar is longer than the diameter of the steering wheel, so that rotating of the steering wheel can be limited thereby; or an extendible hooking bar can be used to lock the steering wheel by locking of the lock head with one end of the bar hooking the steering wheel and the other end hooking the pedal of the accelerator and having the length therebetween of the bar been adjusted; however, these are bothersome in use, some drivers hate to use the steering wheel lock with too much time when in parking, while theft of a car often happens in such a short parking time, this is awfully a pity.

Figure 16:
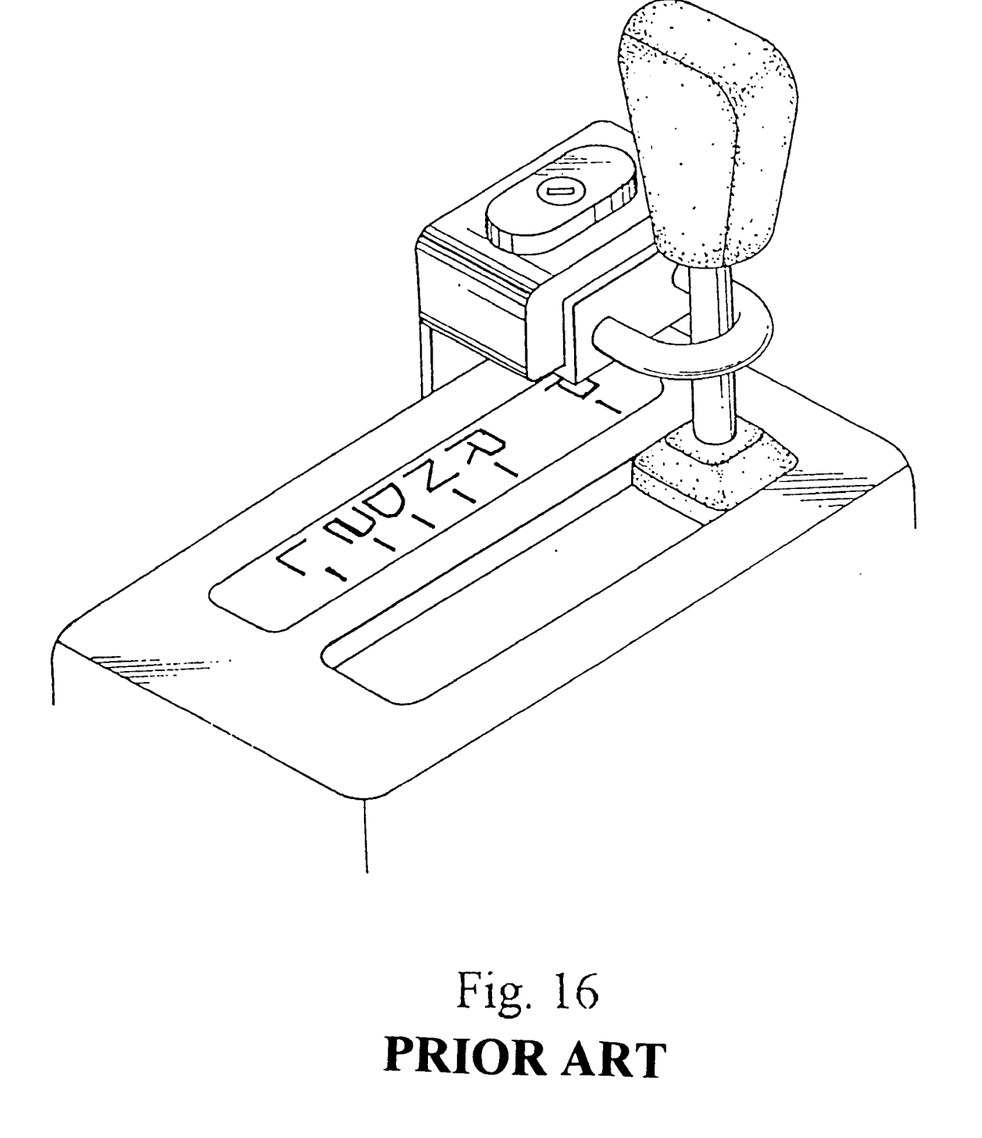
FIG. 16 is a perspective view of a conventional automatic shift lever lock on an automobile.

3) A shift lever lock provides a lock head at the rear side of a body portion of the car behind the shift lever (referring to FIG. 16), with a pivotally connecting hole on the lock head facing to the shift lever and engaged by a U shaped locking hook to lock the shift lever. However, when the lock is opened or closed, a driver must turn his body to operate with two hands in a narrow space in a car and this is quite inconvenient for use.

In view of the above stated disadvantage on a conventional theft-proof car lock, the inventor of the present invention has developed a theft-proof lock device for an automatic shift lever on an automobile, which can still have a theft-proof effect after it is broken based on his experience of years in manufacturing and selling of locks, such a theft-proof lock device can get rid of the disadvantages of the conventional theft-proof lock devices and can still have a theft-proof effect after it is broken.

SUMMARY OF THE INVENTION

Therefore, the primary object of the present invention is to provide a theft-proof lock device for an automatic shift lever on an automobile, which device still has a theft-proof effect after it is broken, wherein, a rear and a front hole is provided respectively on a protruding portion on the front end of an operating rod (placed in a receiving hole of a knob) and at a position on the periphery of an inner end of a push button, these holes can receive exactly therein a limiting rod having a spring surrounding it; when the push button is pressed inwardly or is released, the end of the limiting rod abuts against a plateform in the receiving hole, while the front end thereof can slide freely in the rear and the front holes; when in locking, a stop piece on a lever lock extending between the push button and the protruding portion is rotated to render the stop piece to block transversely between the rear and the front holes, so that the stroke of the limiting rod is reduced and is limited to the area between the stop piece and the plateform in the receiving hole and can not slide, thus an object of locking is attained.

The secondary object of the present invention is to provide a theft-proof lock device for an automatic shift lever on an automobile, which device still has a theft-proof effect after it is broken, wherein, an "Ω" shaped spring leaf is added at the position between the stop piece and the protruding portion, when one end of the stop piece limits and locks the limiting rod, the other end thereof is exactly fixedly clamped by the "Ω" shaped spring leaf, now even if a thief threads through the lever lock with an electric drill, the stop piece does not deviate, when the thief inserts a thin stick for moving the stop piece by rotation, he will fail because there is no space for him to rotate the stop piece, so that the lever lock still has the function of limiting the automatic shift lever for theft-proofing when it has been broken.

The present invention will be apparent in the particular structure, characteristics and functions thereof after reading the detailed description of the preferred embodiment thereof in reference to the accompanying drawings.

DETAILED DESCRIPTION OF THE PREFERRED EMBODIMENT

Figure 1:
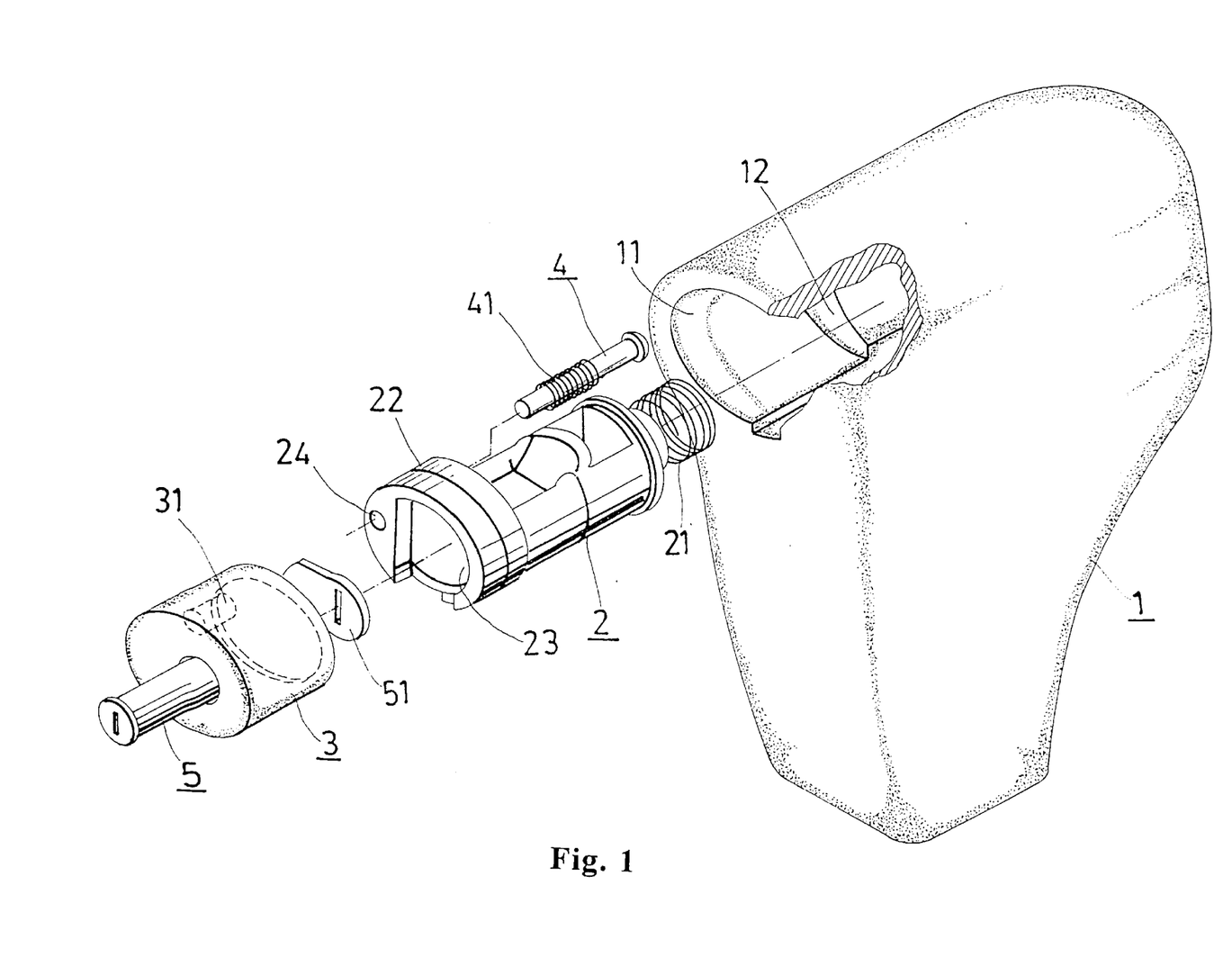
FIG. 1 is an analytical perspective view showing the structure of the present invention.
Figure 2:
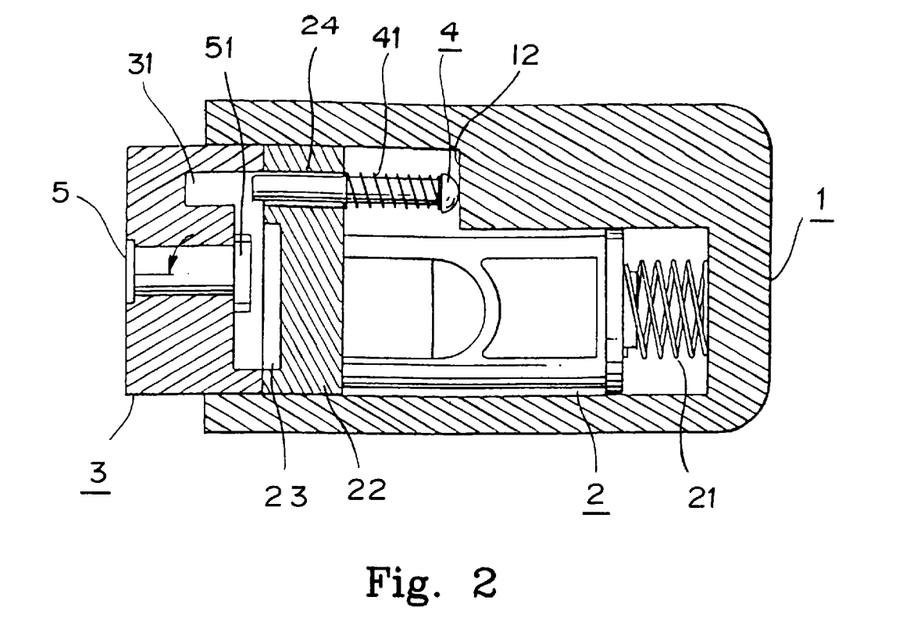
FIG. 2 is a top view of the present invention.
Figure 3:
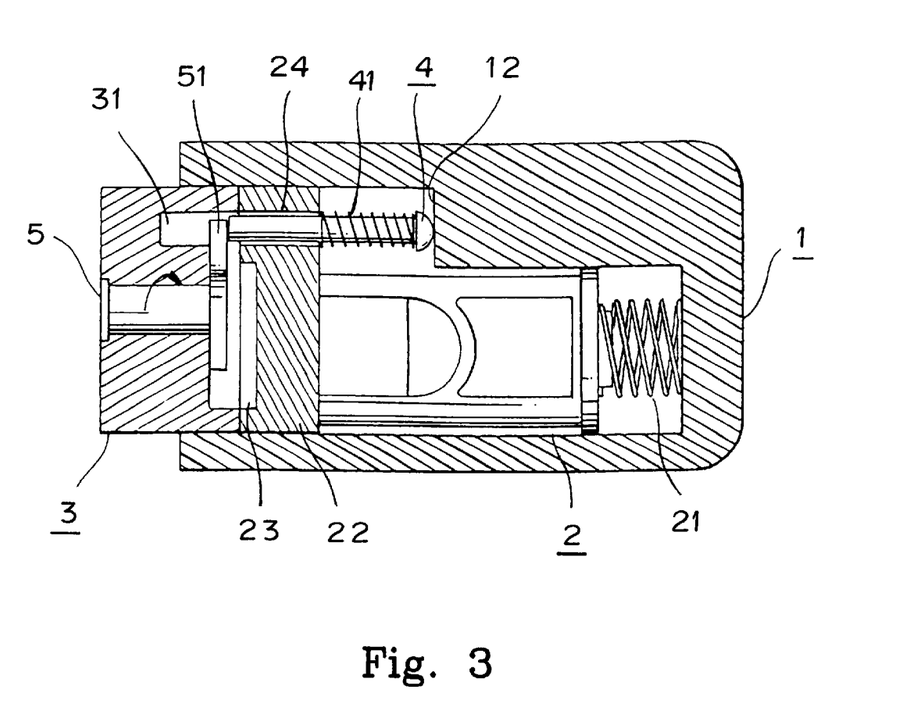
FIG. 3 is a schematic view showing the operation of the present invention.
Figure 4:
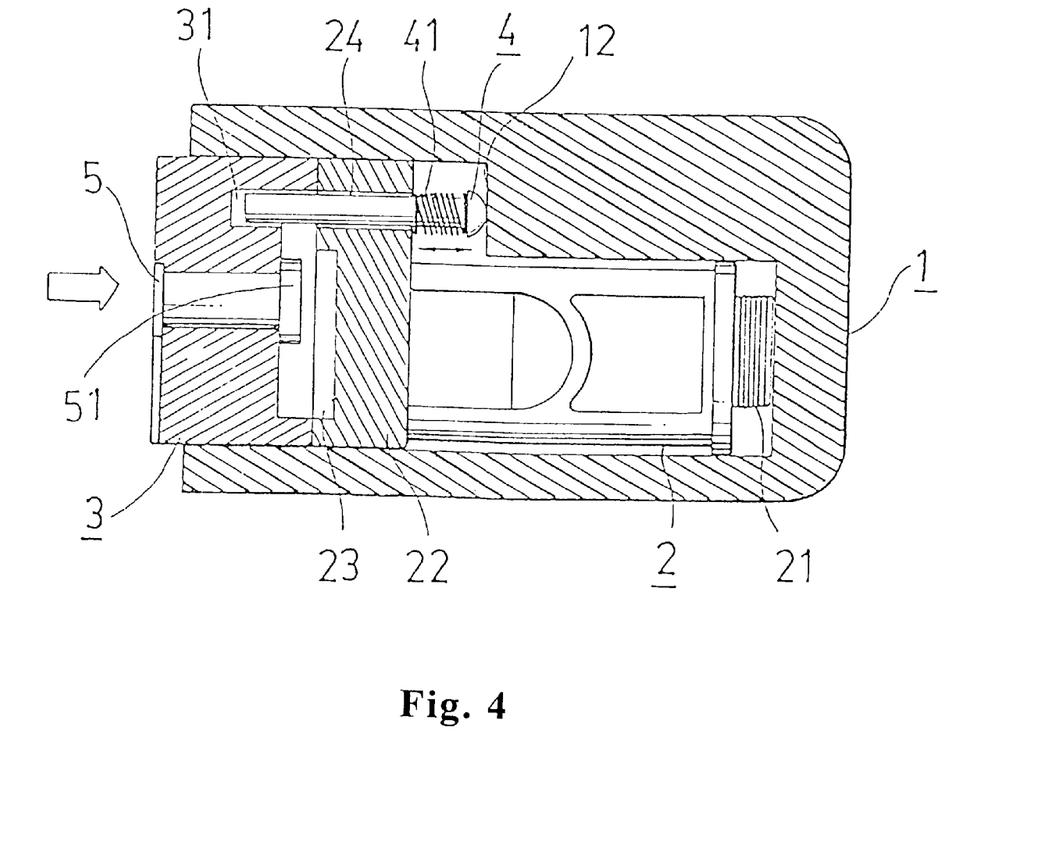
FIG. 4 is a schematic view showing the operation of the limiting rod of the present invention.
Figure 5:
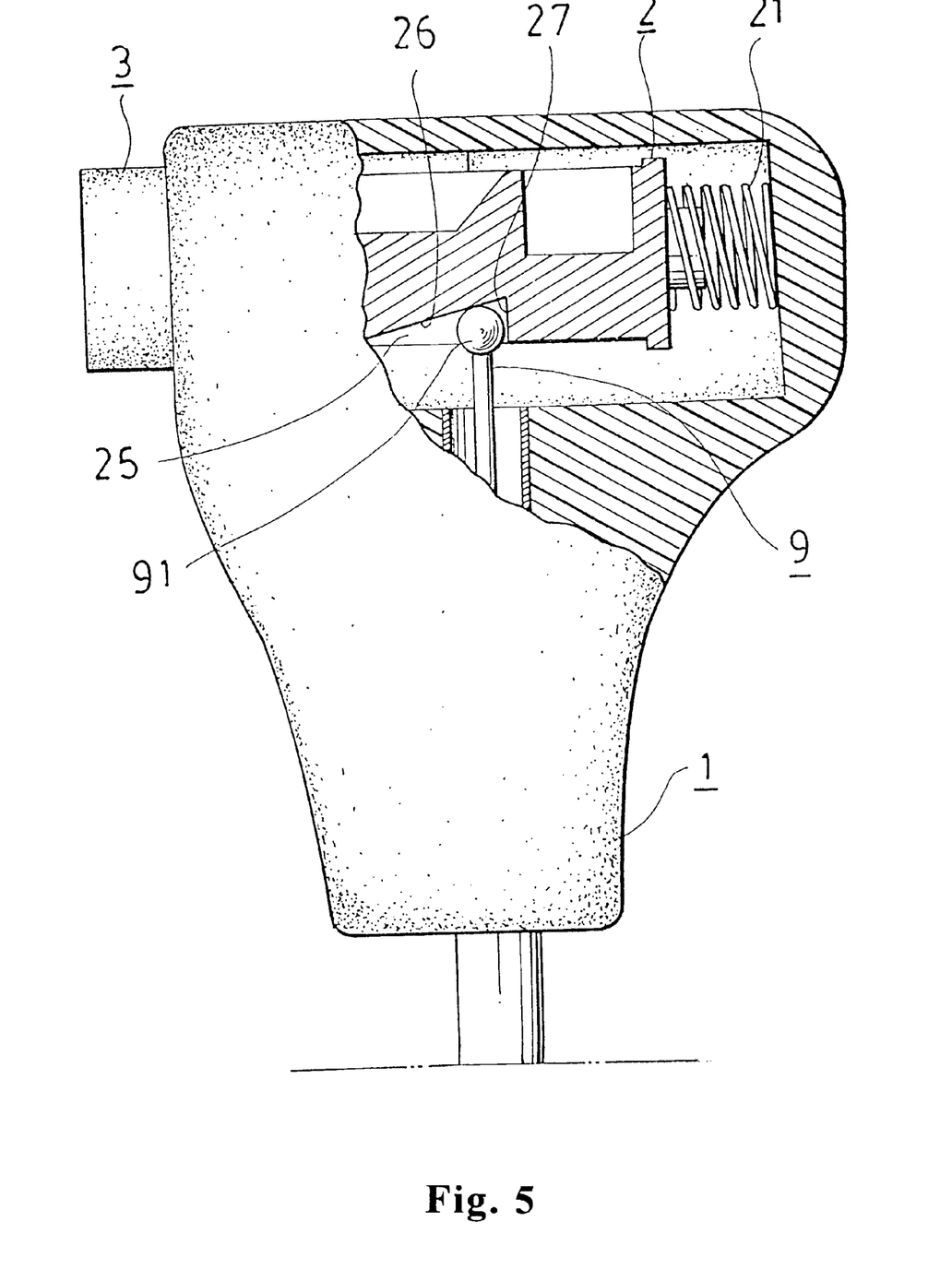
FIG. 5 is a schematic sectional side view showing the structure of the present invention.

It can be clearly seen in FIG. 1, 2, and 3 that the lock device for the automatic shift lever of a car of the present invention comprises mainly a knob 1, an operating rod 2, a push button 3, a limiting rod 4 and a lever lock 5, wherein, the knob 1 is excavated on one side thereof to form a receiving hole 11 of which the front end is relatively larger, the receiving hole 11 is provided with a plateform 12; the operating rod 2 can be inserted in the receiving hole 11, and is provided on the rear end thereof with a spring 21 which abuts against the inner bottom of the receiving hole 11 and the operating rod 2 respectively; the operating rod 2 is extended laterally on the front end thereof to form a protruding portion 22 which is cut to form a groove 23 and is provided on the exterior surface thereof with a rear hole 24 to exactly suit the limiting rod 4, the limiting rod 4 is surrounded by a spring 41, so that the limiting rod 4 can be moved slidingly to and fro by the force of the spring 41 (as shown in FIG. 4); when the operating rod 2 is pressed rearwardly, a bevelled edge 26 of a slide groove 25 on the bottom end of the operating rod 2 can press the head 91 of a transferring rod 9 which can control the gear shifting to move downwardly to shift gear, when the pressure is released, the spring 21 can restore its original position, the head 91 of the transferring rod 9 extends back into the slide groove 25 and abuts against a vertical edge 27, so that the head 91 of a transferring rod 9 can not shift gear (as shown in FIG. 5). The exterior diameter of the abovementioned push button 3 is the same as that of the protruding portion 22, the inner end thereof is recessed and is provided on the periphery thereof with a front hole 31 opposite to the rear hole 24, the elliptical push button 3 itself is provided with the abovementioned lever lock 5 of which a stop piece 51 extends between the push button 3 and the protruding portion 22 and connects to the inner end of the lever lock 5, in the normal position when the lever lock 5 and the operating rod 2 are not in operation, the stop piece 51 points upwardly, while the end of the limiting rod 4 abuts against the plateform 12 in the receiving hole 11 by the force of the spring 41, the front end of the limiting rod 4 can slide freely in the rear hole 24. Referring to FIG. 2, when the push button 3 is pressed, the operating rod 2 can be operated to shift gear, the front end of the limiting rod 4 now extends through the rear hole 24 and into the front hole 31; when the push button 3 is released, the front end of the limiting rod 4 will retreat back into the rear hole 24 as is shown in the drawing. When in locking, the lever lock 5 is rotated (as shown in FIG. 3) to rotate the stop piece 51 at the inner end of lever lock 5 down and to have it blocked transversely between the rear hole 24 and the front hole 31, so that the front as well as rear ends of the limiting rod 4 abut against respectively the stop piece 51 and the plateform 12, and thereby the push button 3 and the operating rod 2 can not be pressed, thus an object of movement limiting and locking is attained.

Figure 6:
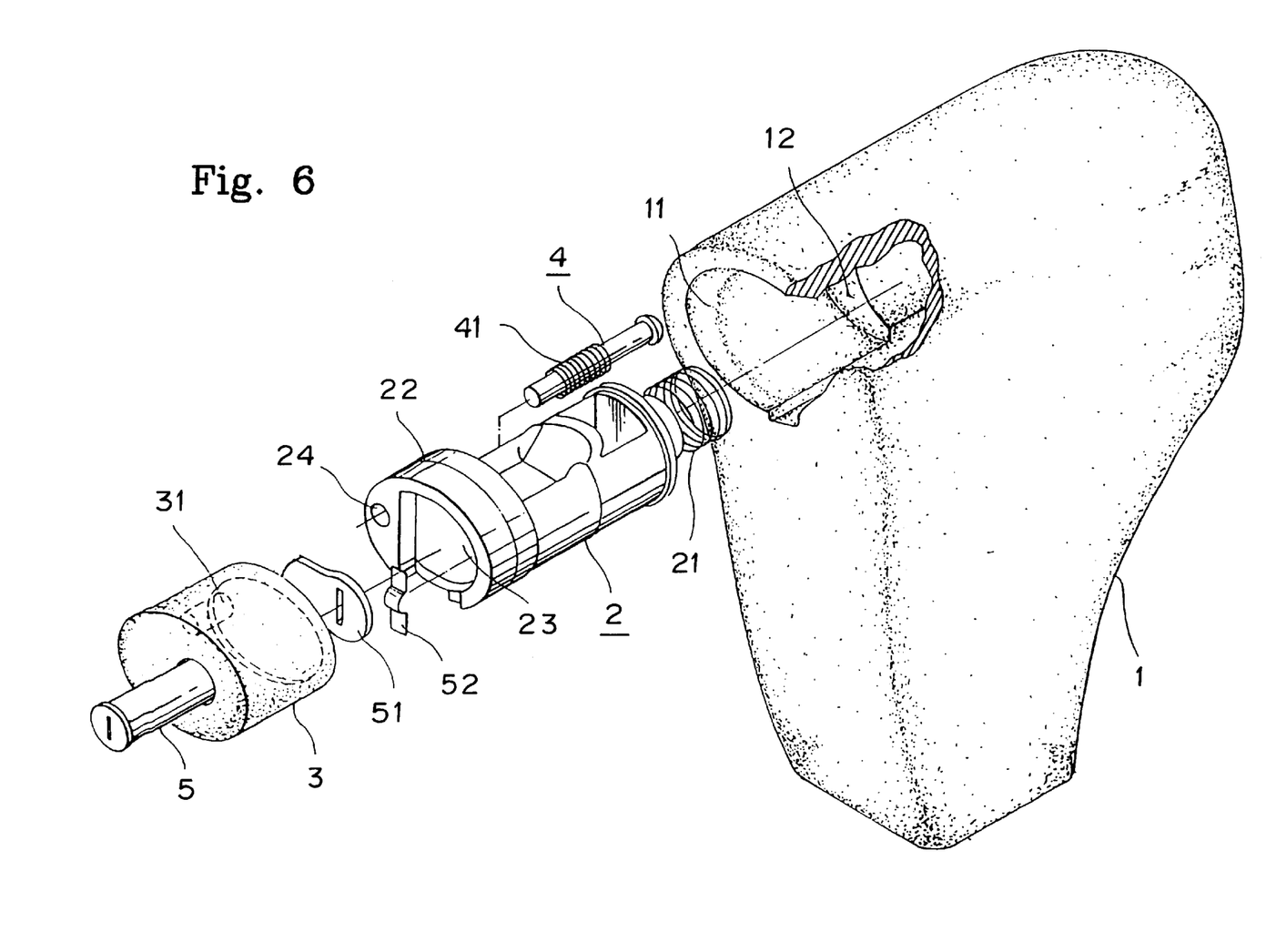
FIG. 6 is a schematic view showing the structure of the present invention, wherein, the lever lock thereof is added to with an "Ω" shaped spring leaf.
Figure 7:
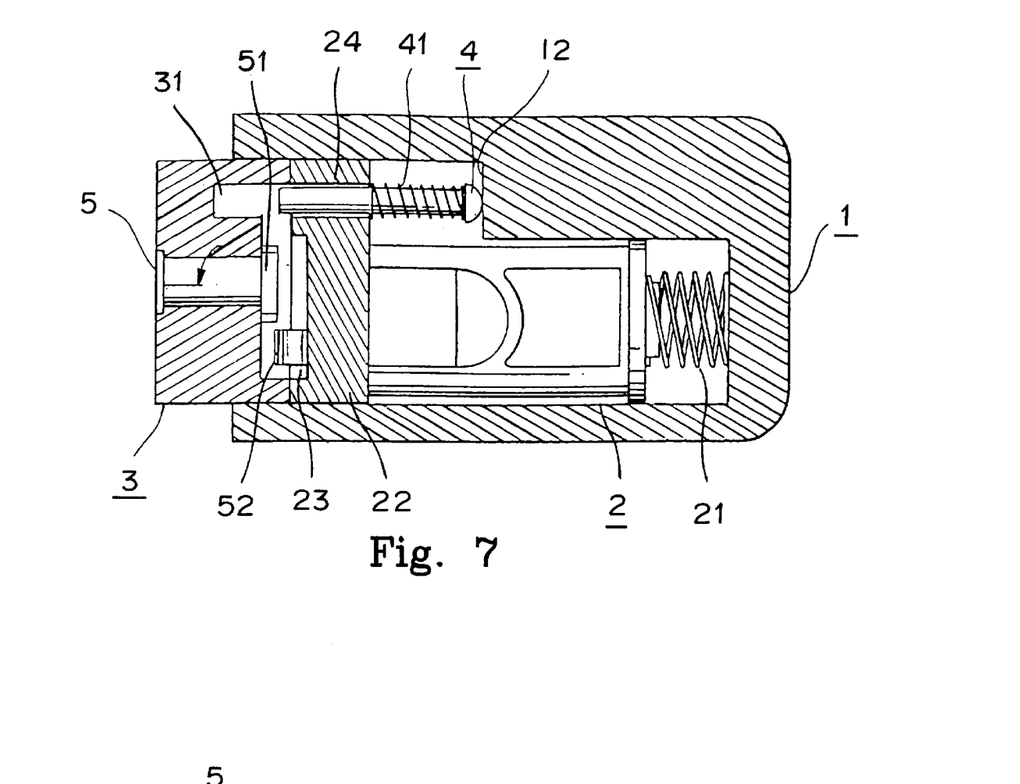
FIG. 7 is a schematic sectional view showing the structure of the present invention, wherein, the lever lock thereof is added to with an "Ω" shaped spring leaf.
Figure 8:
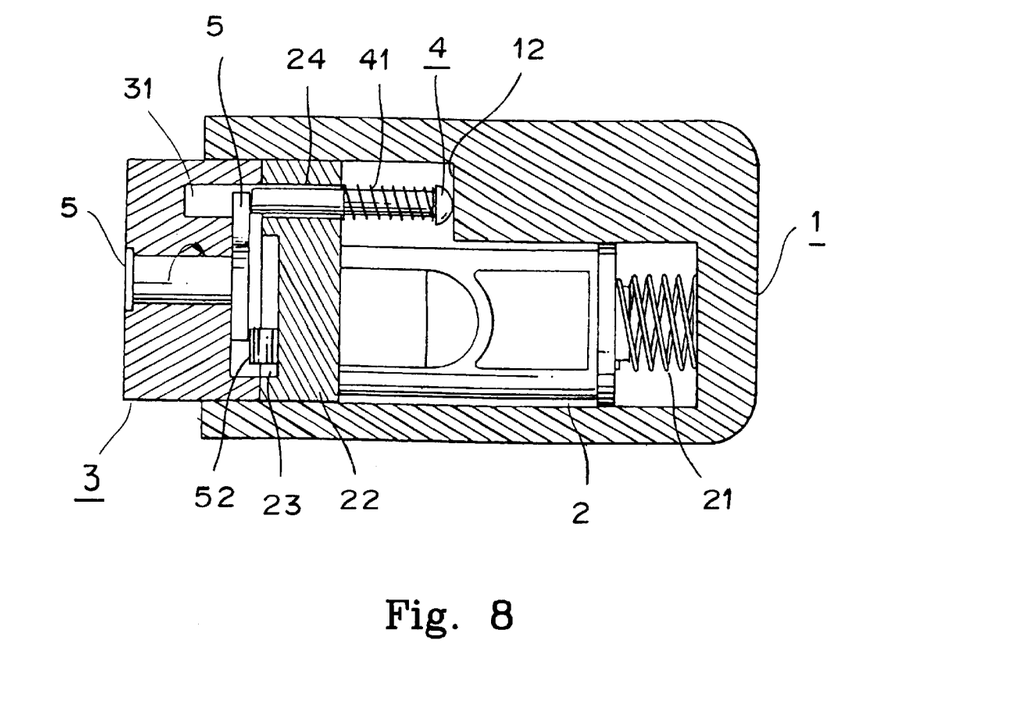
FIG. 8 is another schematic sectional view showing the structure of the present invention, wherein, the lever lock thereof is added to with an "Ω" shaped spring leaf.

Referring to FIG. 6 and 7 of the drawings, an "Ω" shaped spring leaf 52 is added at the position between the stop piece 51 and the groove 23, and when one end of the stop piece 51 is rotated to the position between the rear hole 24 and the front hole 31, the other end of the stop piece 51 is exactly located on the top of the "Ω" shaped spring leaf 52. Therefore now, even if a thief threads through the lever lock 5 with an electric drill, the stop piece 51 does not deviate due to clamping of the "Ω" shaped spring leaf 52; when the thief inserts a thin stick in the front hole 31 for moving the stop piece 51 by rotation, he will fail because there is no space for him to rotate the stop piece 51, so that the lever lock 5 still has the function of limiting the automatic shift lever for the goal of theft-proofing when it has been broken.

Figure 9:
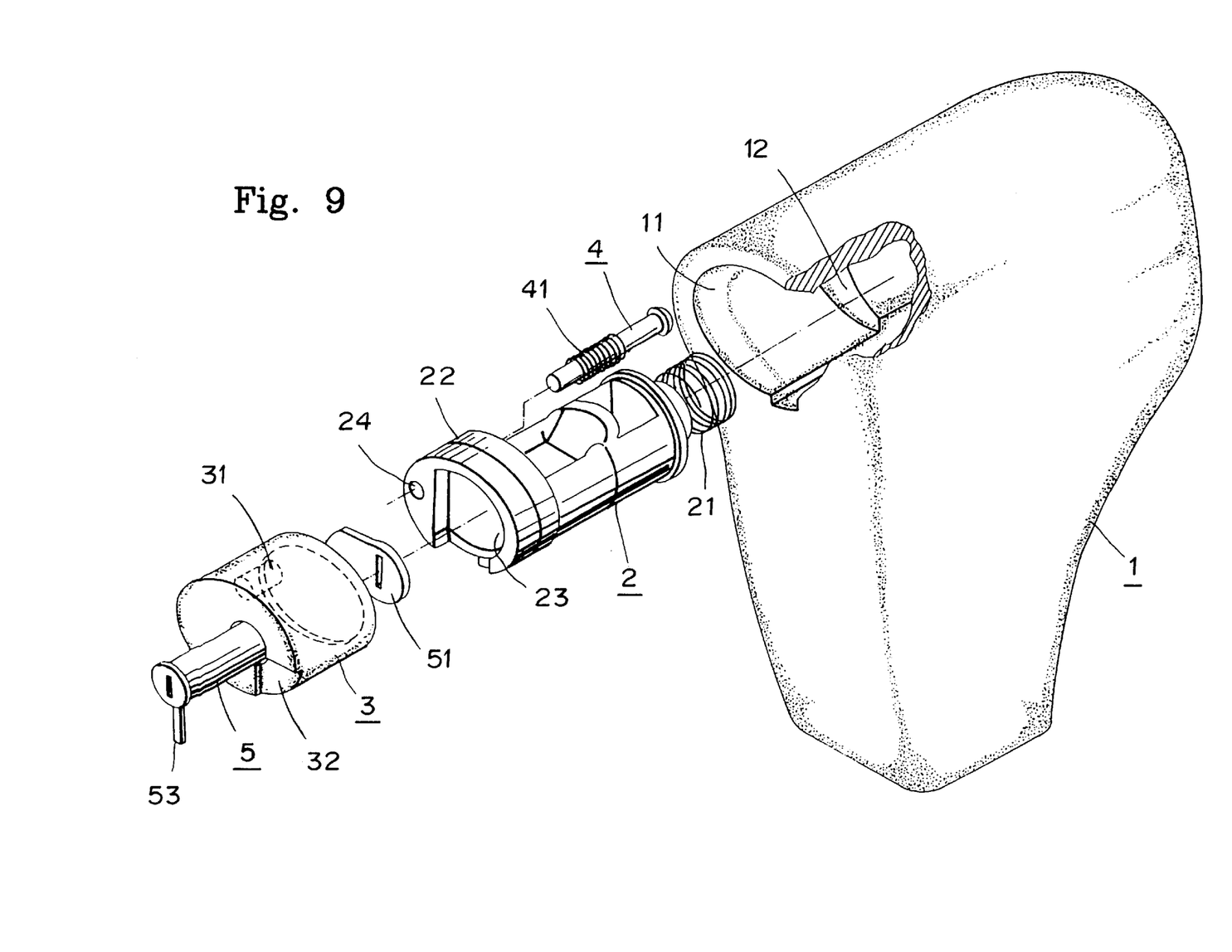
FIG. 9 is a schematic view showing the structure of the present invention, wherein, the lever lock thereof is added to with a push rod.
Figure 10:
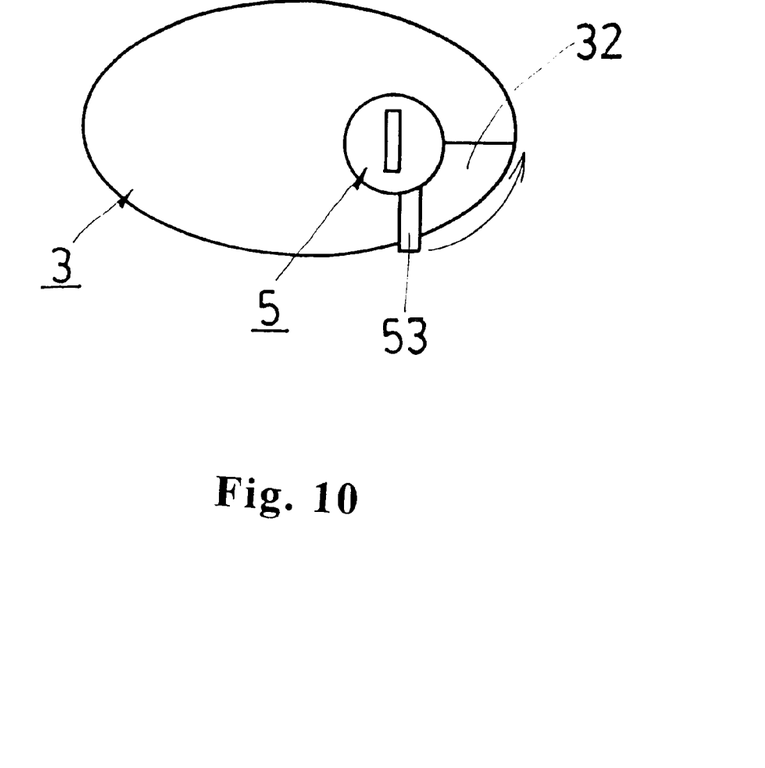
FIG. 10 is a schematic view showing the operation of the lever lock of the present invention added to with a push rod.
Figure 11:
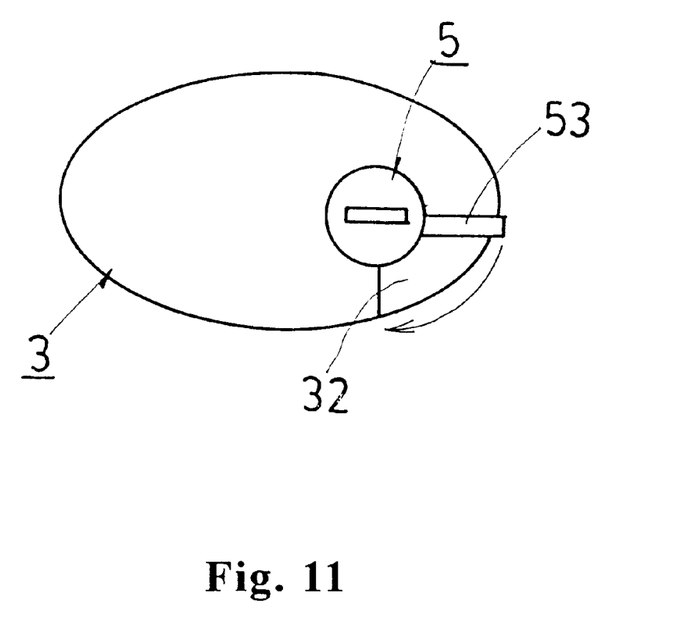
FIG. 11 is another schematic view showing the operation of the lever lock of the present invention added to with a push rod.
Figure 12:
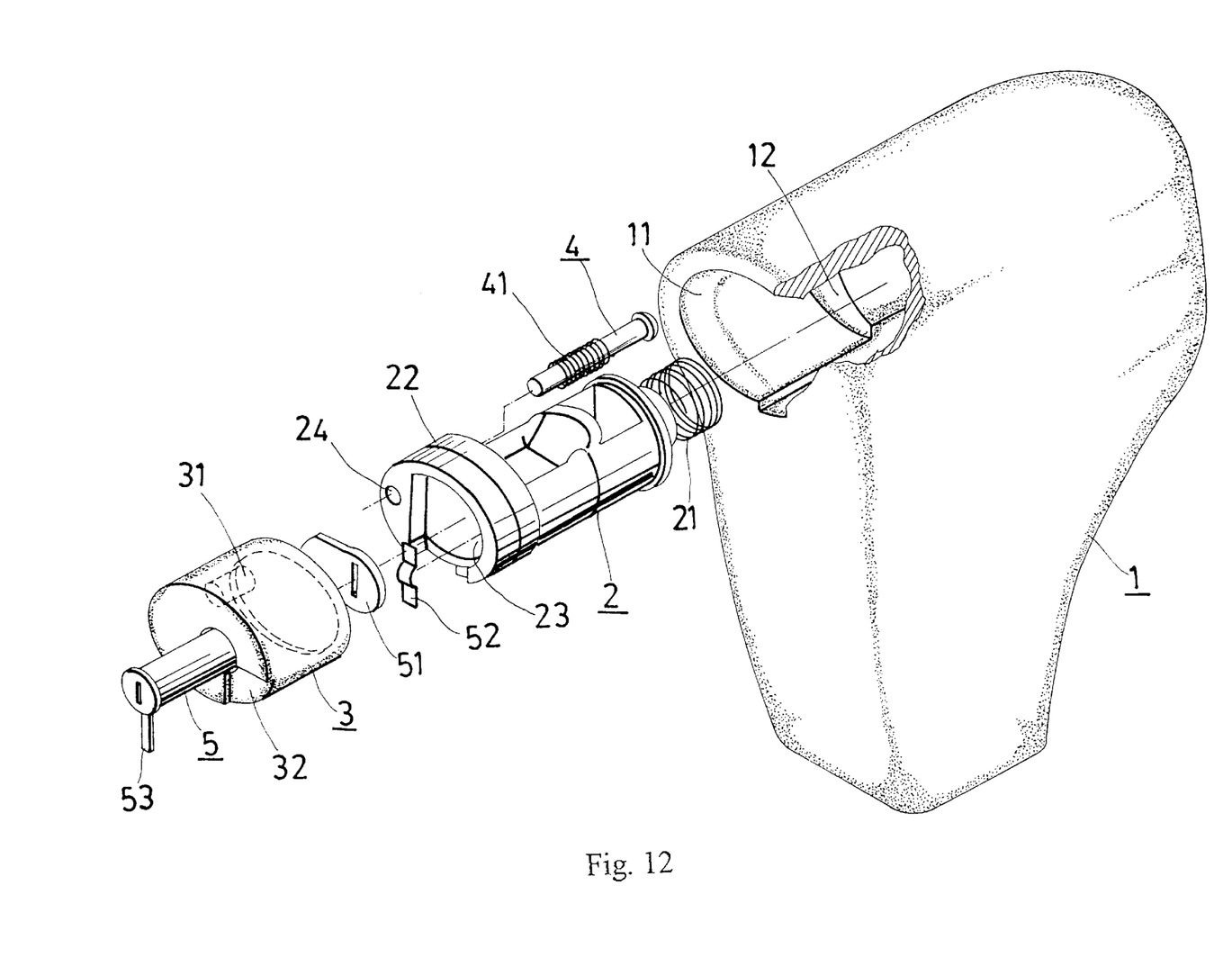
FIG. 12 is a perspective sectional view showing the structure of the present invention, wherein, the lever lock thereof is added to with a push rod and an "Ω" shaped spring leaf.
Figure 13:
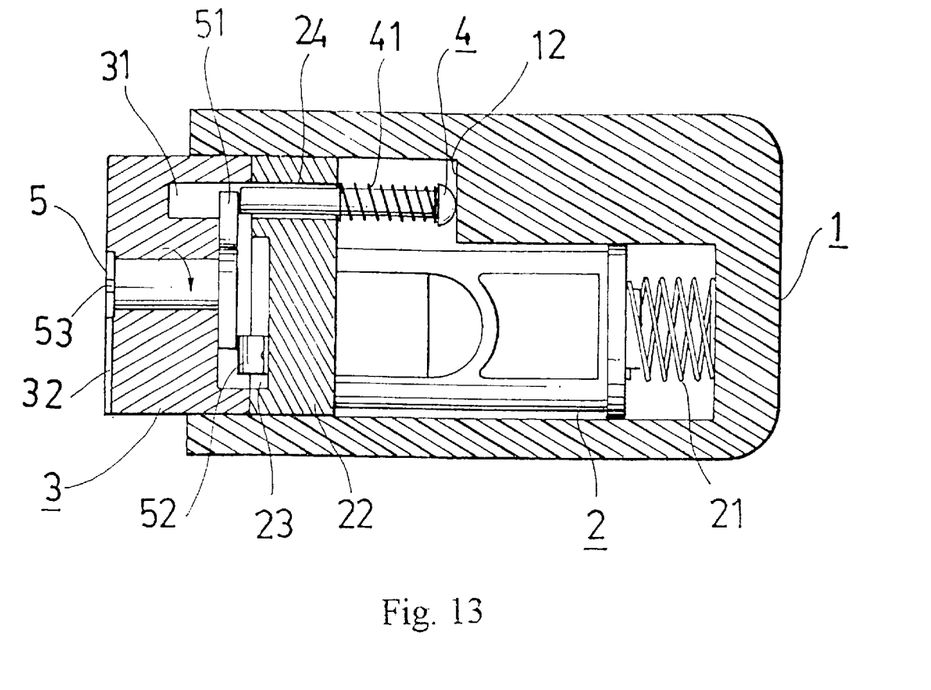
FIG. 13 a schematic sectional view showing the structure of the present invention, wherein, the lever lock thereof is added to with a push rod and an "Ω" shaped spring leaf.
Figure 14:
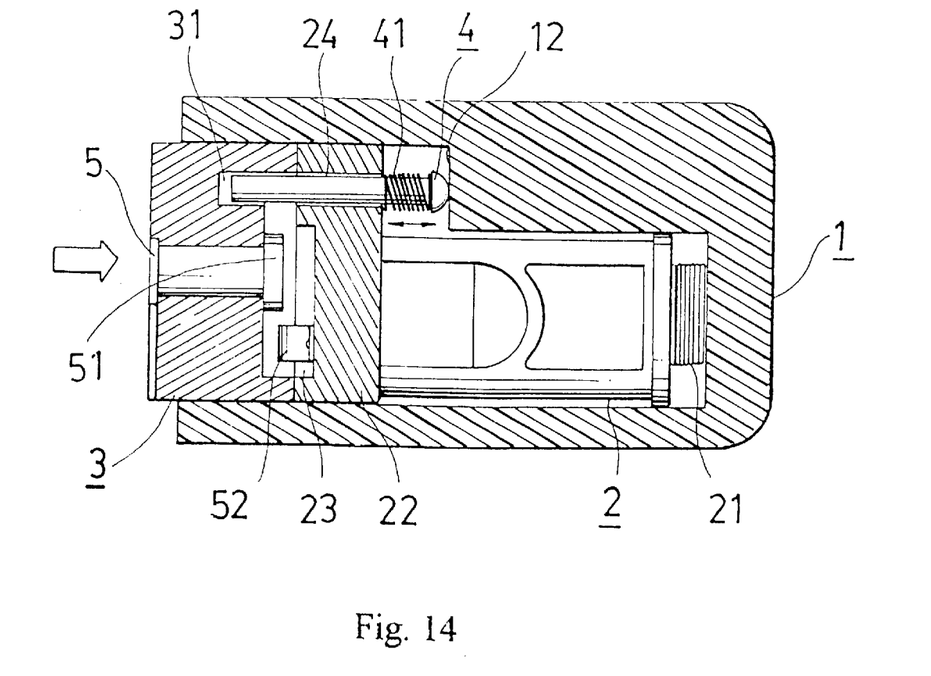
FIG. 14 is another schematic sectional view showing the structure of the present invention, wherein, the lever lock thereof is added to with a push rod and an "Ω" shaped spring leaf.
Figure 15:
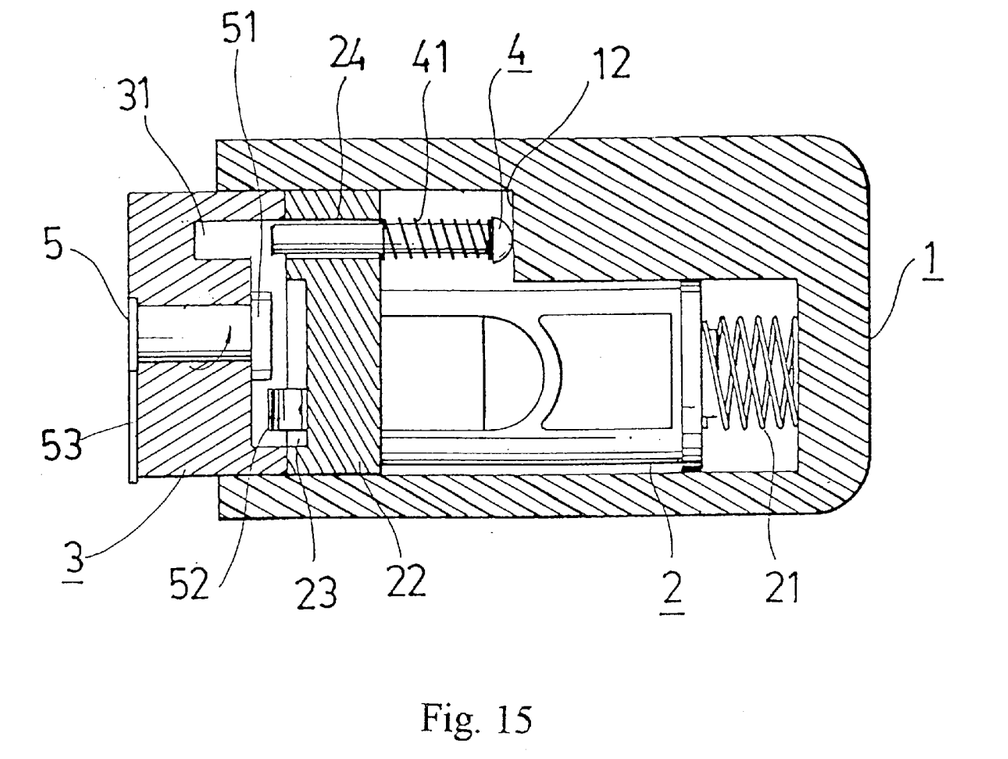
FIG. 15 is further schematic sectional view showing the structure of the present invention, wherein, the lever lock thereof is added to with a push rod and an "Ω" shaped spring leaf.

Referring to FIG. 9, 10 and 11 of the drawings, the lever lock 5 can be provided on the front end thereof with a push rod 53, when the lever lock 5 is pushed into the push button 3, the push rod 53 is engaged in a notch 32 on the push button 3 and slightly protrudes out of the top of the latter, the push rod 53 can be pushed to rotate the lever lock 5 counterclockwise to render the stop piece 51 to rotate to the position between the rear hole 24 and the front hole 31 and thus to limit the limiting rod 4, so that the push button 3 and the operating rod 2 can not be pressed and thus the shift lever is locked; when in unlocking, a key may be inserted into a key hole on the lever lock 5 to unlock.

Further referring to FIG. 12, 13, 14 and 15 of the drawings, the lever lock 5 of the present invention is provided simultaneously with the above stated "Ω" shaped spring leaf 52 and the push rod 53, so that the theft-proof effect and the locking function of the present invention can be achieved, the push rod 53 is used to rotate the lever lock 5 for locking, thus to render the stop piece 51 to rotate to the position between the rear hole 24 and the front hole 31 and to limit the limiting rod 4, the stop piece 51 is clamped by the "Ω" shaped spring leaf 52 to prevent the lever lock 5 from unlocking by a thief.

In conclusion, in the improved lock device for the automatic shift lever of a car of the present invention, the rear hole 24 and the front hole 31 are provided respectively on the inner end of the push button 3 and on the protruding portion 22 of the operating rod 2 to exactly suit the limiting rod 4 surrounded by a spring 41; while the push button 3 itself is provided with the lever lock 5 of which the stop piece 51 extends between the push button 3 and the protruding portion 22, in a normal gear shifting, when the push button 3 and the operating rod 2 are pressed or released, the limiting rod 4 can freely slide to and fro in the rear hole 24 and the front hole 31; and when in locking, the lever lock 5 is rotated to render the stop piece 51 to rotate to the position between the rear hole 24 and the front hole 31 to reduce the stroke of or limit the limiting rod 4; by abutting of the limiting rod 4 against the plateform 12 and the stop piece 51, the push button 3 and the operating rod 2 are prevented from being pressed, thus an object of locking is attained. When an "Ω" shaped spring leaf 52 is added at the inner end of the lever lock 5 where the stop piece 51 is located, one end of the stop piece 51 is exactly located between the top of the "Ω" shaped spring leaf 52 and the inner end of the push button 3. Therefore now, even if a thief inserts a thin stick in the front hole 31 for moving the stop piece 51 by rotation, he will fail because there is no space for him to rotate the stop piece 51, so that the lever lock 5 still has the function of limiting the automatic shift lever for the goal of theft-proofing when it has been broken. The push rod 53 is provided on the lever lock 5 to effect locking.

Such an improved lock device for the automatic shift lever is novel and has never existed in the markets, therefore, what I claim as new and desire to be secured by Letters Patent of the United States are:

I claim:

1. An improved lock device for the automatic shift lever of a car including:

a knob being excavated on one side thereof to form a receiving hole of which the front end is relatively larger than the rear end, said receiving hole being provided with a plateform;

an operating rod capable of controlling movement of a gear shifting transferring rod being inserted in said receiving hole, and being provided on the rear end thereof with a spring which abuts against the bottom of said receiving hole and said operating rod respectively, and being extended laterally on the front end thereof to form a protruding portion;

a push button being provided on the front end of and insertable in said receiving hole, and being placed on the top of said protruding portion;

a lever lock being provided in said push button and being provided with a stop piece;

said lock device is characterized in that:

a rear hole and a front hole are coaxially provided on the inner end of said push button and on said protruding portion to exactly suit a limiting rod surrounded by a spring, the front and rear ends of said limiting rod extend in said rear hole and abut against said plateform respectively, said protruding portion is cut to form a groove, said stop piece on the inner end of said lever lock closely abuts on the inner end of said push button; when said push button and said protruding portion are moved together, said limiting rod which is supported by surrounded said spring can freely slide to and fro relatively to said rear hole and said front hole; and when in locking, said lever lock is rotated to render said stop piece to rotate to the position between said rear hole and said front hole to prevent said limiting rod from extending into said front hole and thus limit said limiting rod to the range between said plateform and said stop piece, said push button and said operating rod thereby are prevented from being pressed, thus an object of locking is attained.

2. An improved lock device for the automatic shift lever of a car as in claim 1, wherein, an "Ω" shaped spring leaf is added at the position between said stop piece and said groove, and when one end of said stop piece is rotated to the position between said rear hole and said front hole, the other end of said stop piece is exactly located on the top of said "Ω" shaped spring leaf to prevent said lever lock from losing the function of theft-proofing when it is broken.

3. An improved lock device for the automatic shift lever of a car as in claim 1, wherein, said lever lock is provided with a push rod, when said lever lock is pushed into said push button, said push rod is engaged in a notch on said push button and slightly protrudes out of the top of the latter, said push rod can be pushed to rotate said lever lock for locking.

* * * * *